US012784313B2

(12) United States Patent
Ota

(10) Patent No.: US 12,784,313 B2
(45) Date of Patent: Nov. 3, 2026

(54) CORRECTION DEVICE, SYSTEM, METHOD, AND PROGRAM

(71) Applicant: Rigaku Corporation, Tokyo (JP)

(72) Inventor: Takumi Ota, Tokyo (JP)

(73) Assignee: RIGAKU CORPORATION, Tokyo (JP)

( * ) Notice: Subject to any disclaimer, the term of this patent is extended or adjusted under 35 U.S.C. 154(b) by 273 days.

(21) Appl. No.: 18/292,823

(22) PCT Filed: Mar. 25, 2022

(86) PCT No.: PCT/JP2022/014455
§ 371 (c)(1),
(2) Date: Jan. 26, 2024

(87) PCT Pub. No.: WO2023/007846
PCT Pub. Date: Feb. 2, 2023

(65) Prior Publication Data

US 2024/0273786 A1 Aug. 15, 2024

(30) Foreign Application Priority Data

Jul. 27, 2021 (JP) ................................ 2021-122585

(51) Int. Cl.
*G06T 12/30* (2026.01)

(52) U.S. Cl.
CPC ........ *G06T 12/30* (2026.01); *G06T 2211/421* (2013.01); *G06T 2211/448* (2023.08)

(58) Field of Classification Search
CPC ....................... G01N 2223/419; G01N 23/046
See application file for complete search history.

(56) References Cited

U.S. PATENT DOCUMENTS

| | | | | |
|---|---|---|---|---|
| 7,134,787 B2 * | 11/2006 | Sun | ...................... | A61B 6/4035 378/207 |
| 2006/0203956 A1 * | 9/2006 | Raupach | .............. | G01N 23/046 378/4 |

(Continued)

FOREIGN PATENT DOCUMENTS

| | | |
|---|---|---|
| JP | 2010-068832 A | 4/2010 |
| JP | 2011-203160 A | 10/2011 |
| JP | 2017-221339 A | 12/2017 |

OTHER PUBLICATIONS

International Search Report mailed on Aug. 2, 2022 in corresponding in PCT Application No. PCT/JP2022/014455, 5 pages.

(Continued)

*Primary Examiner* — Akwasi M Sarpong
*Assistant Examiner* — Michael L Burleson
(74) *Attorney, Agent, or Firm* — XSENSUS LLP

(57) ABSTRACT

A correction apparatus reduces calculation costs for correcting artifacts due to a beam hardening effect in reconstructing a CT image by correcting an artifact due to a beam hardening effect caused in reconstructing a CT image. The correction apparatus includes processing circuitry configured to acquire an incident X-ray distribution, acquire a linear absorption coefficient model representing an energy dependency of a linear absorption coefficient by a scale factor including a parameter, acquire a projection image, and correct the projection image using the incident X-ray distribution and the linear absorption coefficient model.

10 Claims, 15 Drawing Sheets

(56) References Cited

U.S. PATENT DOCUMENTS

| | | | | |
|---|---|---|---|---|
| 2015/0164456 | A1* | 6/2015 | Takamatsu | A61B 6/5258<br>378/4 |
| 2015/0212015 | A1* | 7/2015 | Jeon | G06T 11/003<br>378/4 |
| 2016/0120493 | A1* | 5/2016 | Maeda | A61B 6/5205<br>382/131 |
| 2019/0133541 | A1* | 5/2019 | Proksa | A61B 6/032 |

OTHER PUBLICATIONS

Chinese Office Action issued Apr. 22, 2026 in corresponding Chinese Patent Application No. 202280052823.1, 17 pages.

* cited by examiner

CORRECTION DEVICE, SYSTEM, METHOD, AND PROGRAM

CROSS-REFERENCE TO RELATED APPLICATIONS

The present disclosure is a National Phase Entry of International Application Ser. No. PCT/JP2022/014455 filed Mar. 25, 2022, which claims the benefit and priority of Japanese Patent Application Ser. No. 2021-122585 filed Jul. 27, 2021, each of which are incorporated herein by reference in their entireties.

BACKGROUND

Technical Field

The present disclosure relates to a correction apparatus, system, method and program for correcting an artifact.

Description of the Related Art

A CT device reconstructs a CT image from a plurality of acquired projection images acquired while rotating a sample or a gantry. The reconstructed CT images have artifacts due to a beam hardening effect, because a CT device uses continuous X-rays, and the linear absorption coefficient differs at each energy for each material.

In order to reduce artifacts caused by such a beam hardening effect, correction by hardware or software has been conventionally performed. As a correction method by software, for example, Patent Document 1 discloses a technique for reducing artifacts by performing segmentation of a reconstructed image, specifying a substance, and repeating reconstruction by using a linear absorption coefficient of the substance. Further, Patent Document 2 discloses a technique for reducing artifacts by repeatedly performing forward projection calculation and back projection calculation so that a difference between an original CT image in which a metal artifact is generated and a CT image obtained by performing a forward projection calculation considering the energy dependency of an X-ray absorption coefficient of a substance and a back projection calculation using an image reconstruction algorithm for a single-wavelength is reduced.

PRIOR ART DOCUMENTS

Patent Document

Patent Document 1: JP-A-2010-068832
Patent Document 2: JP-A-2017-221339

SUMMARY

Problems to be Solved

However, in the technique described in Patent Document 1, it is necessary to know the physical property values such as the mass density and the mass absorption coefficient of the sample in advance. In addition, it is necessary to repeat the segmentation and the reconstruction, and therefore, calculation costs are loaded. The technique described in Patent Document 2 requires repeated forward projection calculation and backward projection calculation, and therefore calculation costs are loaded.

The present disclosure has been made in view of such circumstances, and an exemplary embodiment of the present disclosure is to provide a correction apparatus, system, method, and program which can reduce a calculation cost for correcting an artifact due to a beam hardening effect in reconstructing a CT image.

Solutions to the Problems (1) In an exemplary embodiment, the correction apparatus of the present disclosure is a correction apparatus for correcting an artifact due to a beam hardening effect caused in reconstructing a CT image, comprising, an incident X-ray distribution acquiring section for acquiring an incident X-ray distribution, a linear absorption coefficient model acquiring section for acquiring a linear absorption coefficient model representing an energy dependency of a linear absorption coefficient by a scale factor g a parameter, a projection image acquiring section for acquiring a projection image, and a correction section for correcting the projection image using the incident X-ray distribution and the linear absorption coefficient model.

(2) Further, in the correction apparatus of the present disclosure, the linear absorption coefficient model is represented by a product of a linear absorption coefficient at a reference energy and the scale factor.

(3) Further, in the correction apparatus of the present disclosure, the parameter of the linear absorption coefficient model is one parameter.

(4) Further, in the correction apparatus of the present disclosure, the scale factor is represented by a power function having a power exponent as the parameter.

(5) Further, in the correction apparatus of the present disclosure, the parameter of the linear absorption coefficient model is determined based on an energy range of the incident X-ray distribution.

(6) Further, in the correction apparatus of the present disclosure, the parameter of the linear absorption coefficient model is determined from a linear absorption coefficient of a representative group of elements.

(7) Further, in the correction apparatus of the present disclosure, the incident X-ray distribution acquiring section acquires the incident X-ray distribution based on the number, the intensities and the energy values of monochromatic X-rays.

(8) Further, the correction apparatus of the present disclosure comprises a reconstruction section for performing reconstruction based on the projection images corrected by the correction section and generating a CT image and a display section for causing the display device to display the CT image.

(9) Further, the system of the present disclosure comprises, a CT device comprising an X-ray source for generating X-rays, a detector for detecting X-rays, and a rotation control unit for controlling the rotation of the X-ray source and the detector or a sample, and the correction apparatus according to any one of (1) to (8).

(10) Further, the method of the present disclosure is a method for correcting an artifact due to a beam hardening effect caused in reconstructing a CT image, comprising the steps of acquiring an incident X-ray distribution, acquiring a linear absorption coefficient model representing an energy dependency of a linear absorption coefficient by a scale factor including a parameter, acquiring a projection image and correcting the projection image using the incident X-ray distribution and the linear absorption coefficient model.

(11) Further, the program of the present disclosure is a program for correcting an artifact due to a beam hardening effect caused in reconstructing a CT image, causing a computer to execute the following process acquiring an incident X-ray distribution, acquiring a linear absorption coefficient model representing an energy dependency of a linear absorption coefficient by a scale factor including a parameter, acquiring a projection image and correcting the projection image using the incident X-ray distribution and the linear absorption coefficient model.

DETAILED DESCRIPTION

Figure 1A:
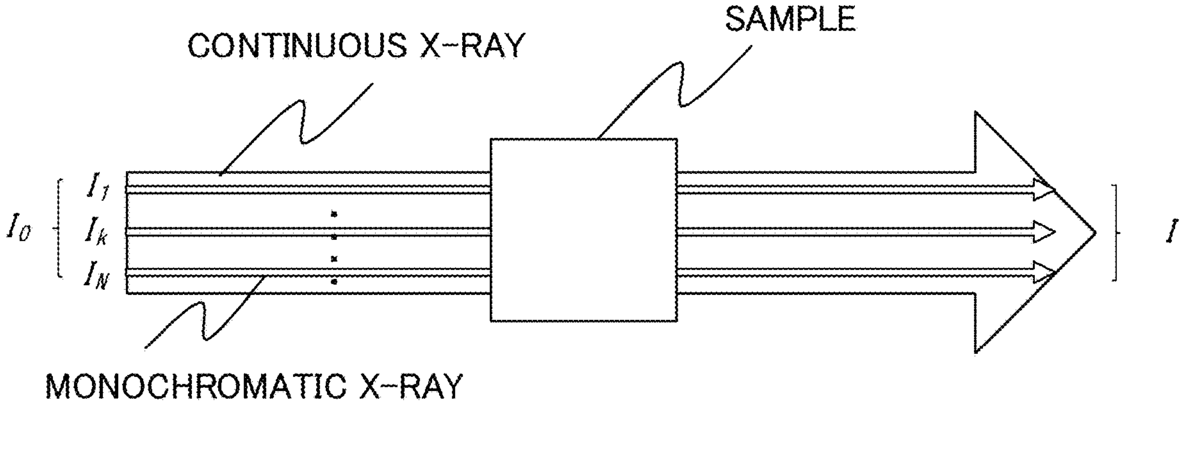
FIG. 1A is a conceptual diagram of X-rays transmitted through a sample.

Next, embodiments of the present disclosure are described with reference to the drawings. To facilitate understanding of the description, the same reference numerals are assigned to the same components in the respective drawings, and duplicate descriptions are omitted.

[Principle]

A CT device irradiates a sample with a cone-shaped or parallel beam of X-rays s from all angles and acquires distribution of the absorption coefficient of the X-rays, that is, a projection image, by a detector. To irradiate X-rays from any angle, the CT device is configured to rotate the sample stage with respect to the fixed X-ray source and the detector or the gantry integrated with the X-ray source and the detector.

Thus, projection is performed from various angles and the distribution of linear absorption coefficient f of the sample can be inferred from the contrast of the acquired projection images of the sample. Then, it is called reconstruction that a three-dimensional linear absorption coefficient distribution is obtained from two-dimensional projection images. The reconstruction basically is performed by the back projection of the projection images.

In the CT device, the projection image is measured by irradiating the sample with the continuous X-ray as the incident X-ray. The linear absorption coefficient of the substance is energy dependent, and the high-energy X-rays tend to be less absorbed. Therefore, when the continuous X-rays as incident X-rays pass through the sample, the energy distribution after passage is not similar to the original distribution, and its centroid shifts to the high energy side. This phenomenon is called beam hardening.

Reconstruction is usually performed assuming the use of the monochromatic X-rays. On the other hand, in actual measurements, continuous X-rays with a wide energy distribution are used. When continuous X-rays are transmitted through the substance, the low-energy X-rays are more absorbed by the sample and more attenuated than the high energy X-rays. Therefore, the linearity between the transmission distance of the X-rays and the attenuation of the X-rays is lost, and the nonlinearity appears. The linearity is maintained when monochromatic X-rays are transmitted through the substance. In this way, artifacts occur because the assumption for the reconstruction does not coincide with the actual phenomena. Such artifacts are called artifacts due to a beam hardening effect.

Conventionally, correction by hardware or software has been performed in order to suppress the artifacts due to a beam hardening effect. Since artifacts due to a beam hardening effect do not occur in perfect monochromatic X-rays, the hardware correction method basically narrows the width of the incident X-ray distribution, which makes the artifacts due to the beam hardening effect less noticeable. For example, a filter is used to extract only X-rays near a specific energy, or a mirror is used to extract monochromatic X-rays.

In addition, in the correction by software, image processing is performed to perform correction. For example, methods of Helgason-Ludwig conditions reduce artifacts by non-linearly correcting the intensity of the projection image using physical conditions such as the conservation law of the linear absorption coefficient. In this method, the correction is performed based on the assumption that the data of the projection image is consistent, and therefore, the correction cannot be applied to a case where a phenomenon other than the beam hardening effect occurs, such as a case where the sample protrudes from FOV at the time of measurement (interior CT), a case where the projection image is defective, a case where there is a misalignment in the optical system such as a center shift, or the like. In addition, since the calculation of the correction amount uses the integration of the projection image, the correction may not be performed successfully due to the fact that the information is compressed, for example, the magnitude relationship of the X-ray intensity is reversed, or the pixel value becomes negative.

There is also a method of reconstructing based on known conditions of a sample. For example, it is such a method that the reconstruction is sequentially performed so that the total variation (TV) of the reconstructed image becomes small under the assumption that there should be a large number of uniform portions in a sample, and non-uniform portions should be generated due to artifacts. In such a method, it is necessary to know in advance what the substance contained in the sample is. Such a method is often used and effective in medical and dental CT where the included materials are limited, but this method cannot be used for a sample that is not known on what to be included. In addition, the sequential method using TV regularization require computational time, resulting in practical problems.

In addition, there is also a method of performing projection calculation assuming continuous X-rays in the sequential method and correcting it, taking into consideration the energy dependency of the incident X-ray distribution and the absorption coefficient. Sequential methods using energy information inevitably require computational time, resulting in practical problems.

According to the present disclosure, the correction can be performed for each detector pixel at each projection angle by correcting the projection image using a linear absorption coefficient model in which the energy dependency of the incident X-ray distribution and the linear absorption coefficient is represented by a scale factor including a parameter (auxiliary variable). Thus, segmentation becomes unnecessary, and the exact information of the sample is no longer used. In addition, the calculation cost can be reduced to correct artifacts caused by beam hardening in the reconstruction by a CT device because the process is performed before the reconstruction. Further, the present disclosure can be applied to a case where a phenomenon other than the beam hardening effect occurs. The linear absorption coefficient model is a function selected so as to approximate the energy dependency of the linear absorption coefficient distribution. This model is represented, for example, by multiplying the scaling factor by the distribution of the linear absorptance at a certain energy $E_0$. Here, the scale factor is a non-negative function s(E) with respect to the energy E, where the value at a certain reference energy $E_0$ is 1.

Figure 1B:
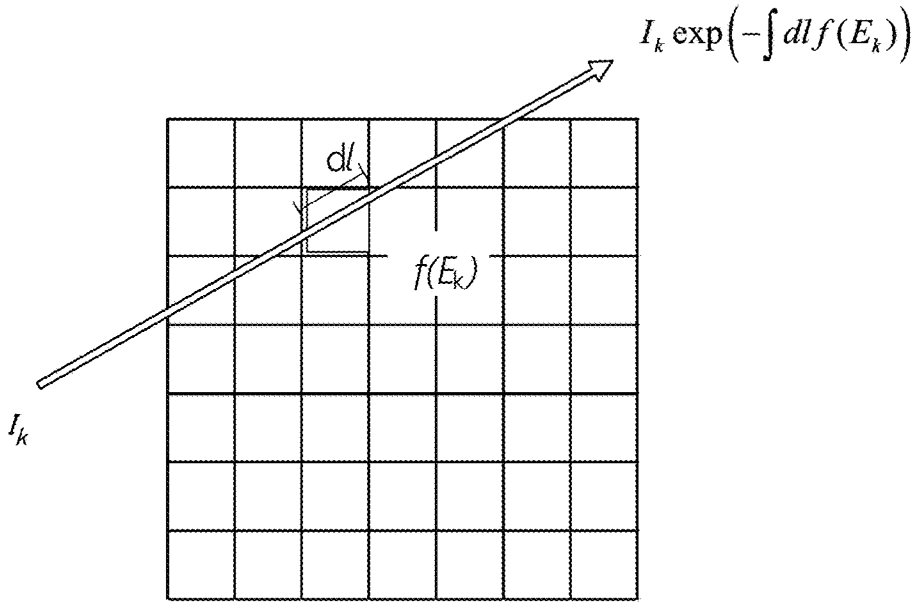
FIG. 1B is a conceptual diagram showing the relationship between a part of a discretized monochromatic X-rays and a measurement space of a sample (voxels) measured by CT measurement.

The correction method according to the present disclosure is explained in detail, as described below. In the present disclosure, it is first assumed that continuous X-rays are a collection of finite monochromatic X-rays. FIGS. 1A and 1B are a conceptual diagram of X-rays transmitted through a sample and a conceptual diagram showing the relationship between a part of a discretized monochromatic X-ray and a measurement space (voxels) of a sample measured by CT measurement. In general, with regard to linearity between the transmission distance of X-rays and the attenuation of X-rays, the X-ray intensity I detected by the detector is represented by formula (1), where l is the thickness of the object, μ is the linear absorption coefficient, and $I_0$ is the incident X-ray intensity (Lambert-Beer's law).

[formula 1]

$$I = I_0\exp(-\mu l) \tag{1}$$

Assuming that continuous X-rays are a collection of N finite monochromatic X-rays, the incident X-ray intensity $I_0$ is replaced by the intensity obtained by integrating the intensity $I_k$ (k=1, 2, . . . , N) of the respective monochromatic X-rays. Further, the nonlinearity of the X-ray transmission distance and the X-ray attenuation is represented by adding the attenuation of each monochromatic X-ray for the total energy. The intensity detected at each pixel of the detector is represented by the following formula (2) as the sum of the intensities of the respective monochromatic X-rays attenuated by the substance.

[formula 2]

$$I = \sum_k I_k \exp\left(-\int dl f(E_k)\right) \tag{2}$$

Figure 2:
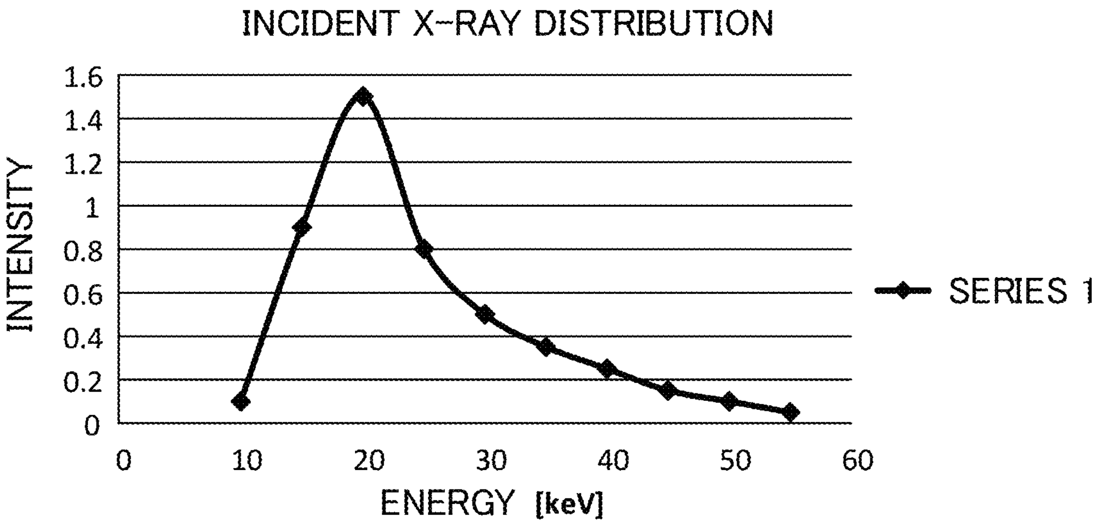
FIG. 2 is a graph showing an example of an incident X-ray distribution.

The energy distribution of continuous X-rays can be represented as a distribution as shown in FIG. 2 by the intensity $I_k$ of each of the N monochromatic X-rays and the energy $E_k$ of each monochromatic X-ray. FIG. 2 is a graph showing an example of an incident X-ray distribution. For example, when an incident X-ray distribution as shown in FIG. 2 is assumed, the continuous X-rays are represented as an energy distribution consisting of N=10 monochromatic X-rays, and an energy range of the incident X-ray distribution and an energy value $E_k$ (k=1, 2, . . . , N) of N monochromatic X-rays are set. For example, assuming that the energy range of the incident X-ray distribution is 10 keV to 55 keV, energy values may be se at such as 10, 15, 20, . . . , 55 keV for equal intervals and the number may be set 10. In addition, the energy values and the number of monochromatic X-rays may be determined from the shape of the distribution where X-rays are closely taken in a portion having a large change and X-rays are sparsely taken in a portion having a low intensity.

Setting the energy values, the number and the intensities of the monochromatic X-rays corresponds to setting $I_k$ of formula (2). In an exemplary embodiment, the number of monochromatic X-rays to be set needs to be 3 or more. In an exemplary embodiment, the number of monochromatic X-rays to be set needs to be 5 or more. Since the incident X-ray distribution is known to some extent from the information of the tube voltage and the filter, such knowledge may be used. Also, the user may arbitrarily select or designate it.

In the present disclosure, the energy-dependence of $f(E_k)$ on the right-hand side of formula (2) is replaced with a linear absorption coefficient model represented by a scale factor containing parameters. The energy dependency of the linear absorption coefficient is represented by a scale factor including parameters. The energy range (the domain of $s(E_k)$) for calculating the scale factor $s(E_k)$ is set to include the energy range in which the incident X-ray distribution is set. For example, $f(E_k)$ can be represented as the product of the linear absorption coefficient $f(E_0)$ for a certain energy $E_0$ as a reference included in the domain of the scale factor and the scale factor $s(E_k)$ including the parameter, as in formula (3) below. By performing correction using such a linear absorption coefficient model, it is possible to obtain projection images with the distribution of the linear absorption coefficient at the reference energy.

[formula 3]

$$f(E_k) = f(E_0)s(E_k) \tag{3}$$

When $f(E_k)$ on the right side of formula (1) is replaced with the expression on the right side of formula (3), formula (2) is expressed by the following formula (4).

[formula 4]

$$I = \sum_k I_k \exp\left(-\int dl f(E_0)s(E_k)\right) \tag{4}$$

Formula (2) is for calculating the line integral of the projection image for the total energy. Therefore, in formula (2), it is necessary to calculate the value of the line integral for each energy. In contrast, formula (4) is for calculating the line integral of the projection image at a certain energy $E_0$. Thus, in formula (4), information on the other energy is known from the absorption coefficient at the reference energy by the scale factor. The number of unknowns is reduced, which facilitates the calculation. In addition, in an exemplary embodiment, the parameter of the scale factor is one parameter. Thus, the calculation is further simplified. However, when calculating accurately, a plurality of parameters may be set.

By solving this equation by Newton method, it is possible to obtain a projection image of the linear absorption coefficient distribution at a certain energy $E_0$. This line integral corresponds to the projection of the linear absorption coefficient distribution at the energy $E_0$. This is referred to as a corrected projection image. That is, the projection image of the continuous X-rays is converted into a projection image at a certain energy $E_0$. When reconstruction is performed using such corrected projection images, it is possible to obtain a CT image in which artifacts due to a beam hardening effect are reduced.

The reference energy $E_0$ may be selected as long as it is within the domain of $s(E_k)$. For example, the lower limit value of the energy range of the incident X-ray distribution may be selected, or the average value of the energy range of the incident X-ray distribution may be selected.

Next, a functional form representing the linear absorption coefficient model is set. In an exemplary embodiment, the scale factor of the linear absorption coefficient model is represented by a power function having a power exponent as a parameter. Thus, calculation for correction becomes easier. The fact that the scale factor of the linear absorption coefficient model is expressed by a power function means that, for example, $s(E_k)$ of formula (3) is expressed as formula (5) below. However, the scale factor included in the linear absorption coefficient model is not limited to this. Such a function having a functional form that can approximate the energy dependency of the linear absorption coefficient may be used. For example, an exponential function, a logarithmic function, or the like may be used. In an exemplary embodiment, the scale factor included in the linear absorption coefficient model is selected from the viewpoint of both the approximation degree of the energy dependency of the linear absorption coefficient and the subsequent calculation cost.

[formula 5]

$$s(E_k) = \left(\frac{E_k}{E_0}\right)^\alpha \tag{5}$$

Thus, the linear absorption coefficient model is expressed by the following formula (6). In addition, using the linear absorption coefficient model, the intensity I detected at each detector pixel is expressed by formula (7).

[formula 6]

$$f(E_k) = f(E_0)\left(\frac{E_k}{E_0}\right)^\alpha \tag{6}$$

[formula 7]

$$I = \sum_k I_k \exp\left(-\int dl f(E_0)\left(\frac{E_k}{E_0}\right)^\alpha\right) \tag{7}$$

In an exemplary embodiment, the linear absorption coefficient model is determined based on the energy range of the incident X-ray distribution. Thus, an appropriate linear absorption coefficient model corresponding to the linear absorption coefficient of the representative element group can be determined, and artifacts due to a beam hardening effect can be corrected more appropriately. The fact that the linear absorption coefficient model is determined based on the energy range of the incident X-ray distribution means that $s(E_k)$ and $E_0$ of formula (4) can be changed depending on the energy range of the incident X-ray distribution. When the linear absorption coefficient model is used, the linear absorption coefficient of each monochromatic X-ray can be calculated from the behavior of the linear absorption coefficient of a representative element under the assumed incident X-ray distribution. For example, when the incident X-ray distribution is in an energy range (e.g., 10 to 100 keV) used in a typical CT device, if the energy dependency of the linear absorption coefficient of the element (e.g., Ti, Fe) that is considered to be the cause of the metal artifact is known, the linear absorption coefficient $f(E_k)$ of each monochromatic X-ray can be calculated based on the linear absorption coefficient $f(E_0)$ at the reference energy $E_0$ from the ratio of the reference energy $E_0$ and the scale factor at the energy $E_k$ of each monochromatic X-ray. Here, only the value of the parameter may be changed in the same function. In an exemplary embodiment, when the linear absorption coefficient model is represented by a power function, the parameter α is determined and changed as follows.

In an exemplary embodiment, the parameters α of the formulas (6) and (7) are set such that the attenuation of the mass absorption coefficient of the element applied to the correction is similar to that of the element included in the sample. The mass absorption coefficient has characteristics that the slope is different for each element, the position of the absorption edge is different, and the slopes in the smaller side and the larger side than the absorption edge are different, so in an exemplary embodiment, a is set by such a method below.

Figure 3:
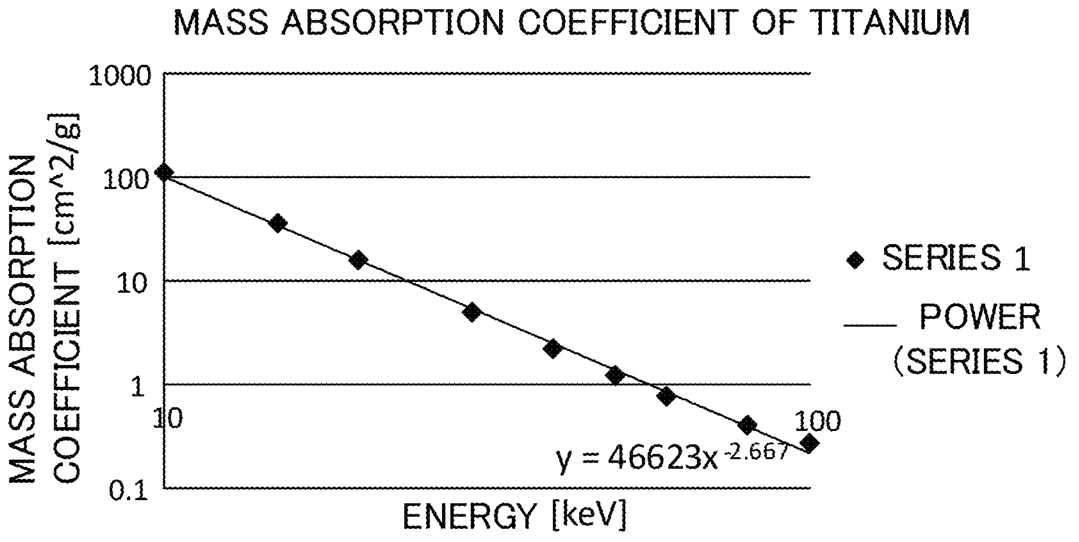
FIG. 3 is a graph showing the mass absorption coefficient of titanium.
Figure 4:
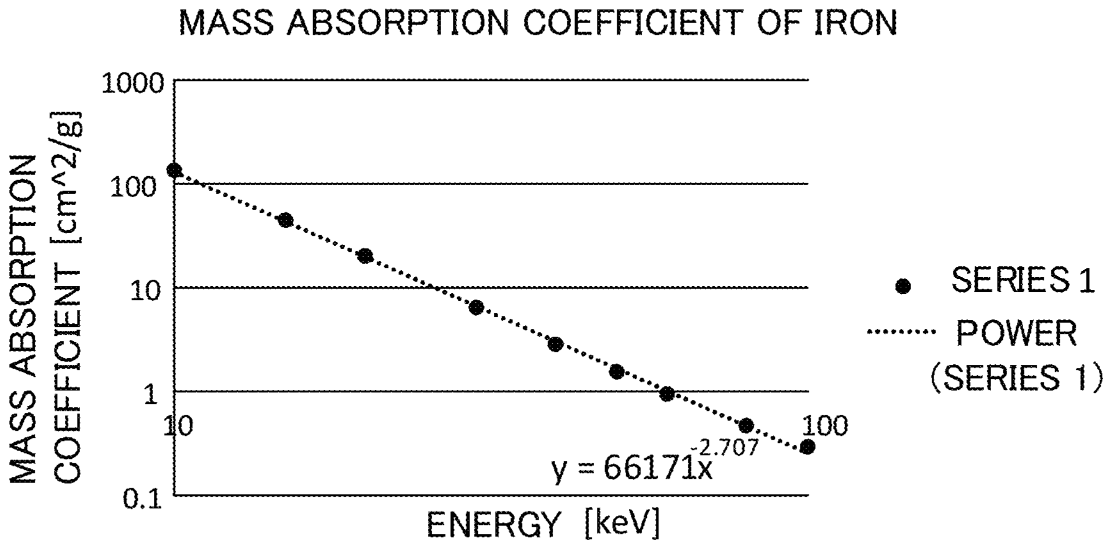
FIG. 4 is a graph showing the mass absorption coefficient of iron.

(i) A representative element is selected. For example, elements such as Ti(α=−2.667), Fe(α=−2.707) and the like can be selected as typical elements. FIG. 3 and FIG. 4 are graphs showing the mass-absorption coefficients of Ti and Fe, respectively. In an exemplary embodiment, the representative elements are elements included in the sample. In addition, in an exemplary embodiment, an element whose absorption edge is not included in the used range of energy is selected.

(ii) In an exemplary embodiment, representative elements to be selected are selected from the group of light elements, the group of middle elements and the group of heavy elements. For example, the light element group may consist of H to Ne, the middle element group may consist of Na to Ca, and the heavy element group may consist of Sc or higher. The boundaries of the light element group, the middle element group, and the heavy element group can be changed according to the field. Further, in an exemplary embodiment, elements having similar energy dependencies of the linear absorption coefficients are specified. In an exemplary embodiment, the parameter α is calculated by fitting a power function but does not necessarily have to match the fitting result and may be arbitrarily set using the fitting result as a reference.

(iii) In an exemplary embodiment, when an element with an absorption edge included in the energy-range to be used is selected, the average slope from the slope OR in the smaller side is calculated rather than the absorption edge and the slope al in the larger than the absorption edge and use the calculated mean slope as a.

As described above, by representing the linear absorption coefficient model with a power factor and appropriately setting the value of the parameter α within a predetermined range, the calculation for the correction becomes easier further, and the artifacts due to the beam hardening effect in the reconstruction by CT device can be effectively corrected. In addition, it is possible to greatly reduce the calculation cost for this purpose.

[Entire System]

Figure 5:
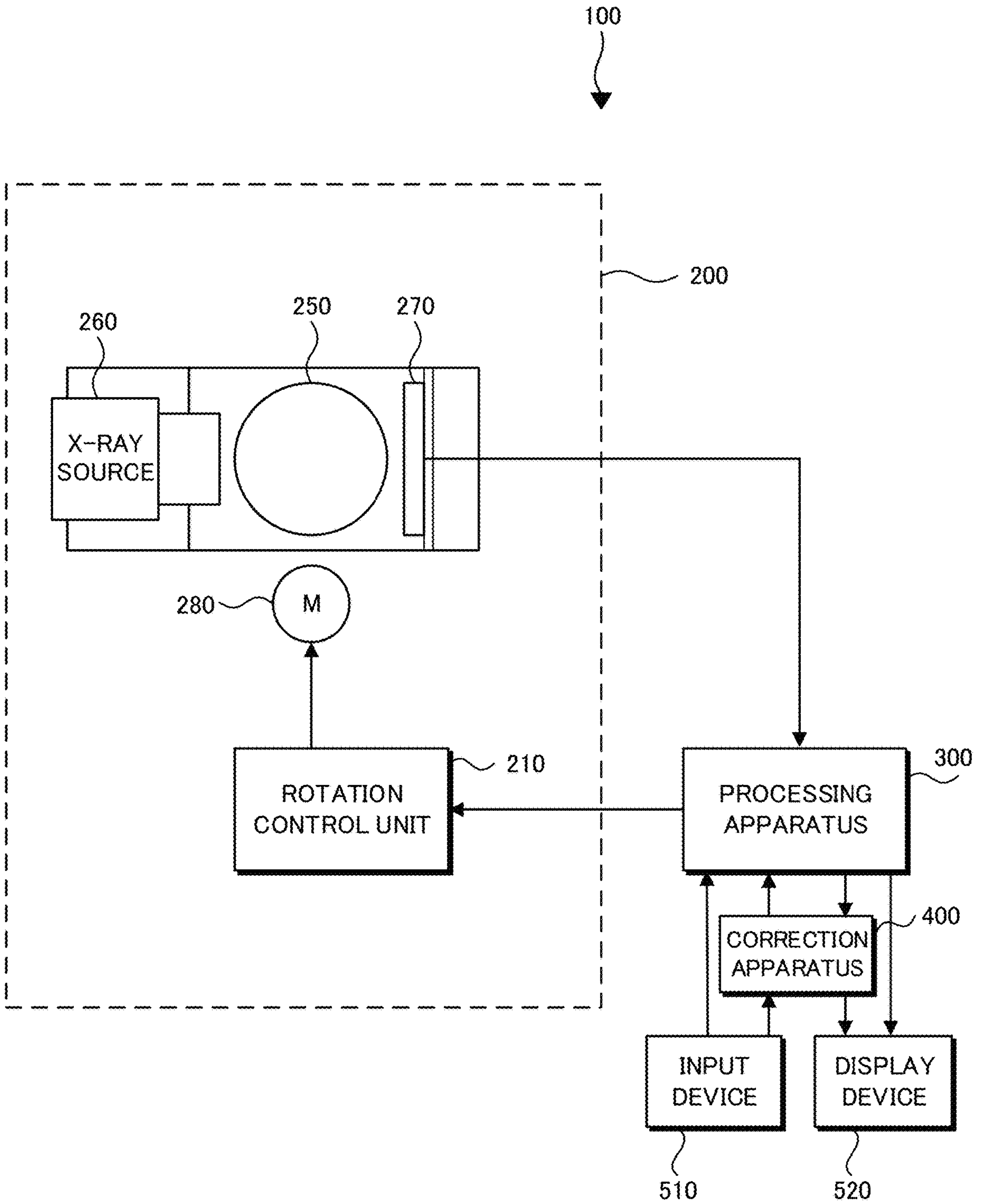
FIG. 5 is a schematic diagram showing an example of a configuration of the entire system.

FIG. 5 is a schematic diagram showing a configuration of an entire system 100 including a CT device 200 and a processing apparatus 300, a correction apparatus 400, an input device 510, and a display device 520 connected to the CT device 200. Here, CT device 200 shown in FIG. 5 is configured to rotate the sample with respect to the X-ray source 260 and the detector 270, but the present disclosure is not limited thereto, and may be configured to rotate the gantry in which the X-ray source and the detector are integrated. For the CT device 200, both a device using a collimated beam and a device using a cone beam can be used.

The processing apparatus 300 is connected to the CT device 200 and performs control of the CT device 200 and processing of the acquired data. The correction apparatus 400 corrects the projection images. The processing apparatus 300 and the correction apparatus 400 may be PC terminals or servers on the cloud. The input device 510 is, for example, a keyboard or a mouse, and performs input to the processing apparatus 300 or the correction apparatus 400. The display device 520 is, for example, a display, and displays a projection image or the like.

Figure 6:
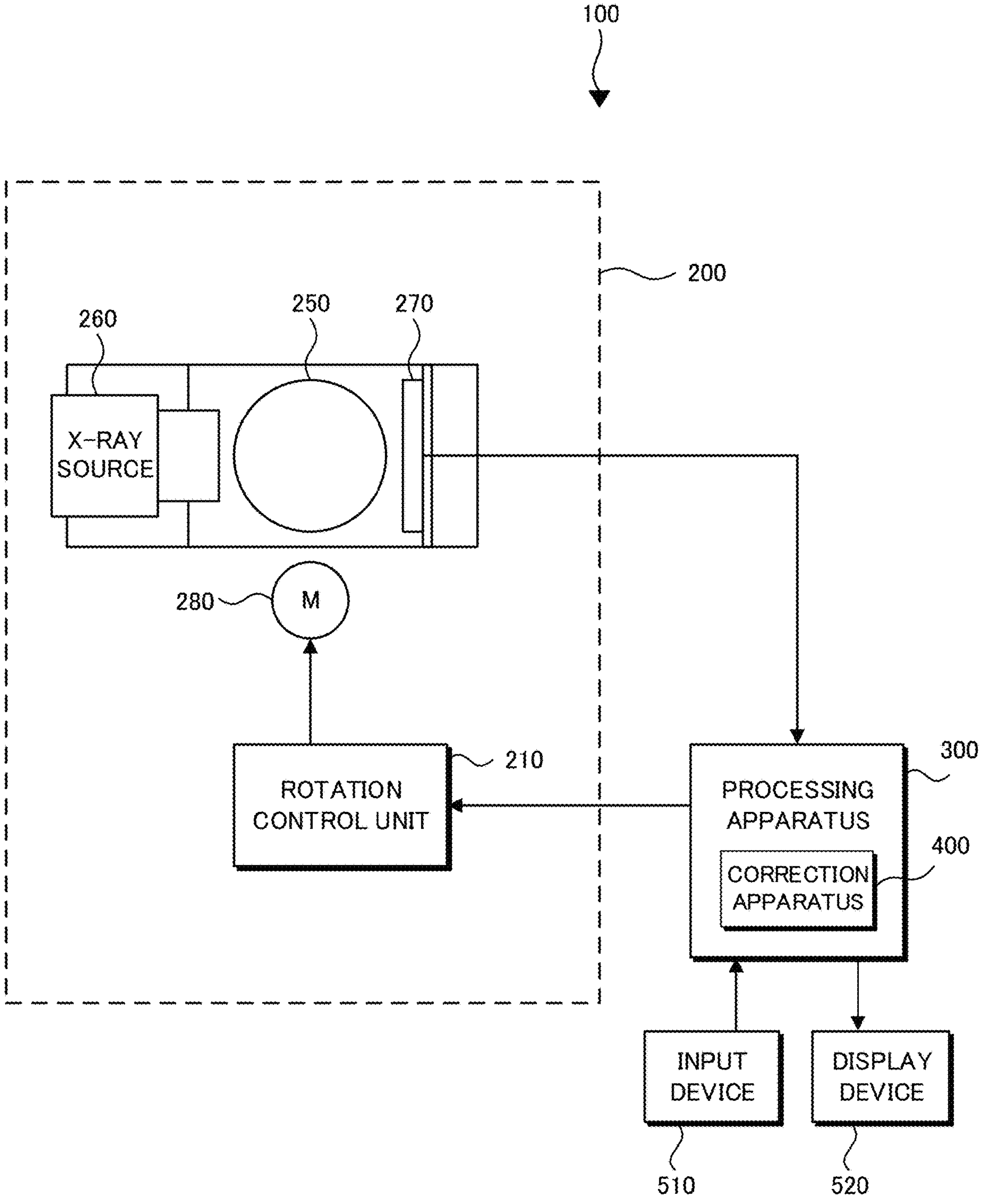
FIG. 6 is a schematic diagram showing a modified example of a configuration of the entire system.

Note that, in FIG. 5, the processing apparatus 300 and the correction apparatus 400 are shown as separate components in order to emphasize the correction function of the correction apparatus 400, but as shown in FIG. 6, the correction apparatus 400 may be configured as a part of the function included in the processing apparatus 300, or the correction apparatus 400 and the processing apparatus 300 may be configured as an integral unit. FIG. 6 is a schematic diagram showing a modified example of a configuration of the entire system. By using such a system, the calculation cost for correcting artifacts due to the beam hardening effect in the reconstruction of CT images can be reduced.

[Ct Device]

As shown in FIG. 5, the CT device 200 includes a rotation control unit 210, a sample stage 250, an X-ray source 260, a detector 270 and a driving section 280. X-ray CT imaging is performed by rotating the sample stage 250 installed between the X-ray source 260 and the detector 270. Note that the X-ray source 260 and the detector 270 may be installed on a gantry, and the gantry may be rotated with respect to a sample fixed to the sample stage 250.

The CT device 200 drives the sample stage 250 at a timing instructed by the processing apparatus 300 and acquires projection images of the sample. The measurement data is transmitted to the processing apparatus 300. The CT device 200 is suitable for use in precision industrial products such as semiconductor devices but can be applied to an apparatus for animals as well as an apparatus for industrial products.

The X-ray source 260 emits X-rays toward the detector 270. The detector 270 has a receiving surface for receiving X-rays and can measure the intensity distribution of X-rays transmitted through the sample by a large number of pixels. The rotation control unit 210 rotates the sample stage 250 at a speed set at the time of CT measurement by the driving section 280.

[Processing Apparatus]

Figure 7:
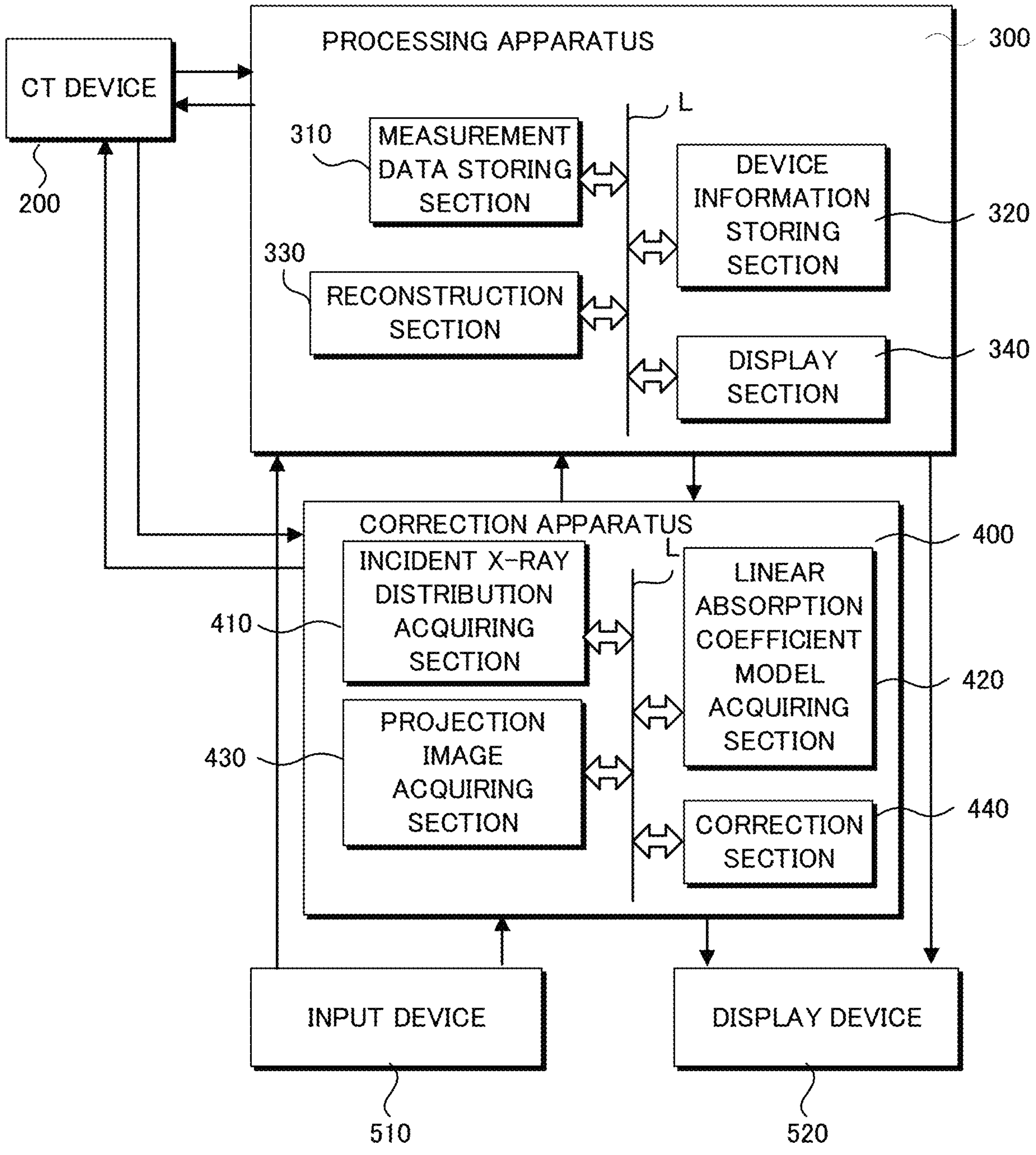
FIG. 7 is a block diagram showing one example of a configuration of the processing apparatus and the correction apparatus.

FIG. 7 is a block diagram showing a configuration of the processing apparatus 300 and the correction apparatus 400. The processing apparatus 300 is configured by a computer formed by connecting a CPU (Central Processing Unit), a ROM (Read Only Memory), a RAM (Random Access Memory), and a memory to a bus. The processing apparatus 300 is connected to the CT device 200 and receives information.

The processing apparatus 300 comprises a measurement data storing section 310, a device information storing section 320, a reconstruction section 330, and a display section 340. Each section can transmit and receive information via the control bus L. The input device 510 and the display device 520 are connected to CPU via an appropriate interface.

The measurement data storing section 310 stores measurement data acquired from the CT device 200. The measurement data include rotation angle information and corresponding projection images. The device information storing section 320 stores device information acquired from the CT device 200. The device information includes device name, beam shape, geometry at the time of measurement, scanning method, etc. The reconstruction section 330 reconstructs a CT image from the projection images for the reconstruction. The display section 340 causes the display device 520 to display the reconstructed CT image. Thus, the user can confirm the CT image based on the corrected projection images. In addition, the user can instruct or designate the processing apparatus, the correction apparatus, or the like based on the CT image.

[Correction Apparatus]

Figure 8:
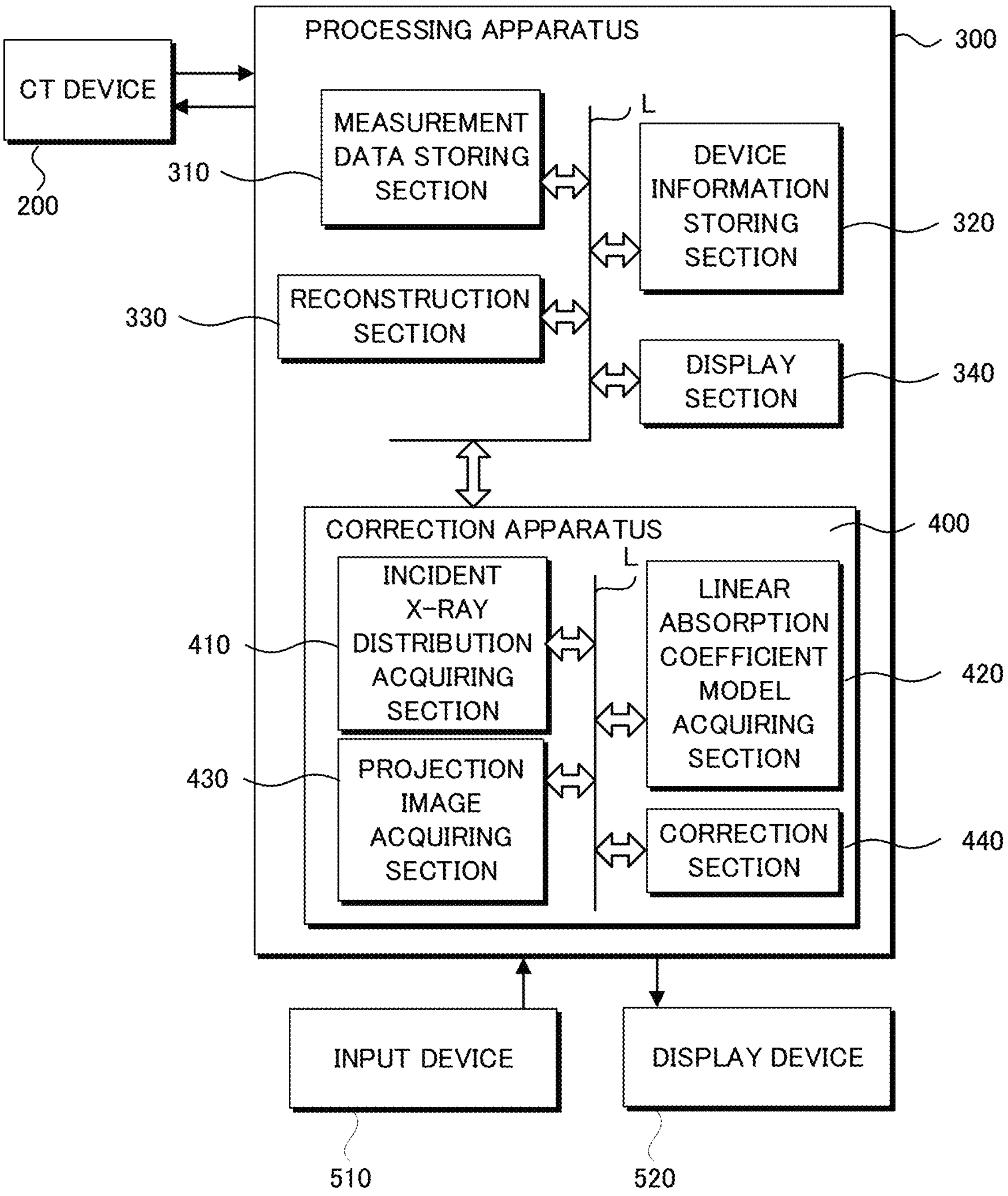
FIG. 8 is a block diagram showing a modified example of a configuration of the processing apparatus and the correction apparatus.
Figure 9:
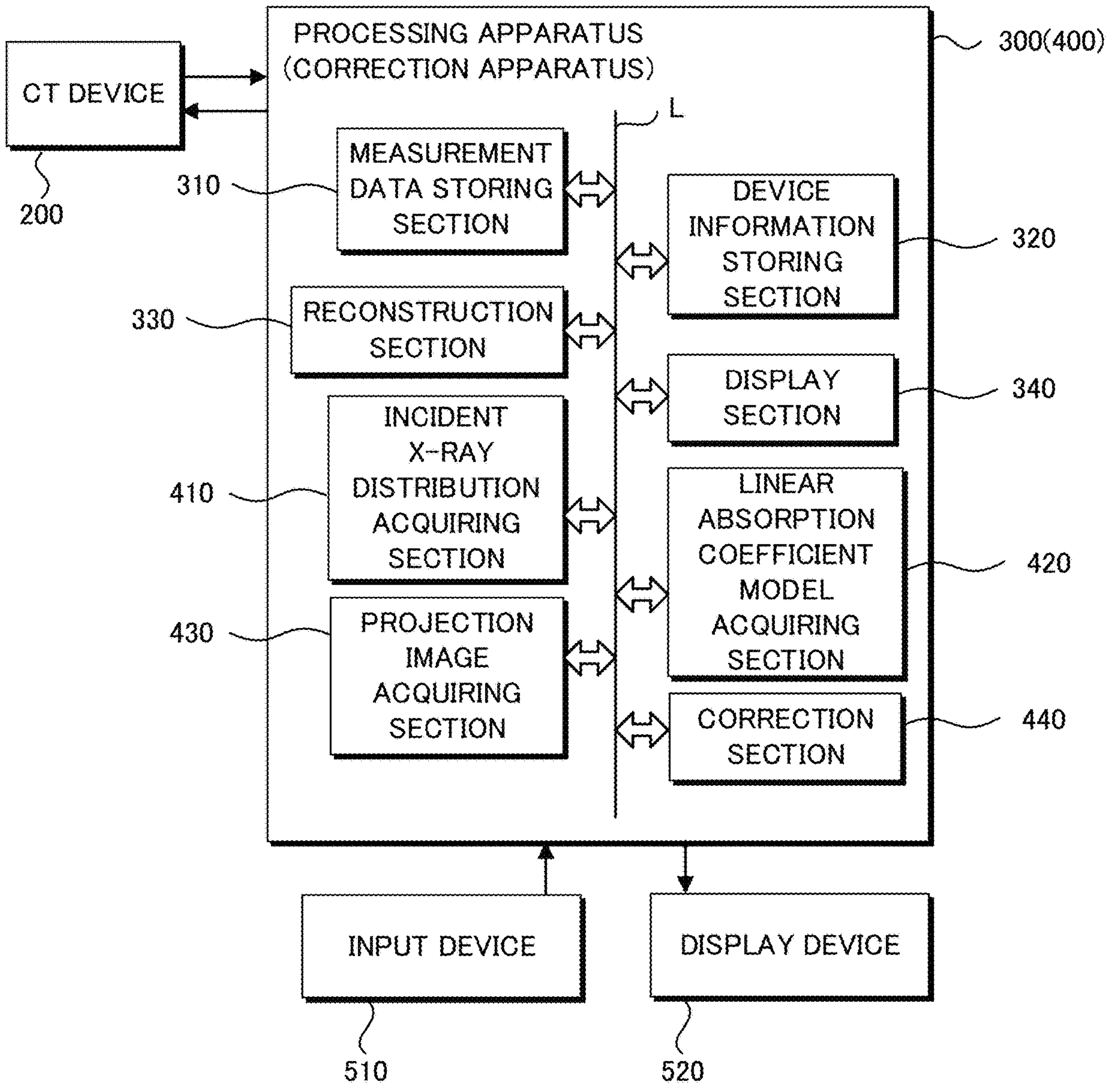
FIG. 9 is a block diagram showing a modified example of a configuration of the processing apparatus and the correction apparatus.

The correction apparatus 400 is configured from a computer formed by connecting CPU, ROM, RAM and a memory to a bus. The correcting apparatus 400 may be directly connected to the CT device 200 or may be connected to CT device 200 via the processing apparatus 300. In addition, the correcting apparatus 400 may receive information from the CT device 200 or may receive information from the processing apparatus 300. Note that, as shown in FIG. 8, the correction apparatus 400 may be configured as a part of the functions included in the processing apparatus 300, or as shown in FIG. 9, the correction apparatus 400 and the processing apparatus 300 may be configured as an integral unit. In addition, the correction apparatus 400 may include a part of the function of the processing apparatus 300.

The correction apparatus 400 comprises an incident X-ray distribution acquiring section 410, a linear absorption coefficient model acquiring section 420, a projection image acquiring section 430, and a correction section 440. Each section can transmit and receive information via the control bus L. When the correction apparatus 400 and the processing apparatus 300 have different configurations, the input device 510 and the display device 520 are also connected to CPU of the correction apparatus 400 via an appropriate interface. In this case, the input device 510 and the display device 520 may be different from those connected to the processing apparatus 300.

The incident X-ray distribution acquiring section 410 acquires an incident X-ray distribution. In an exemplary embodiment, the incident X-ray distribution acquiring section 410 acquires an incident X-ray distribution based on the number, the intensities and the energy values of monochromatic X-rays. Thus, a more appropriate incident X-ray distribution can be acquired according to the situation. In an exemplary embodiment, the incident X-ray distribution acquiring section 410 acquires an incident X-ray distribution based on user designation. Thus, the user can select a more appropriate incident X-ray distribution according to the situation. In an exemplary embodiment, when the incident X-ray distribution is specified by the user, a UI function capable of setting an incident X-ray distribution is used, for example, specifying one from a plurality of incident X-ray distributions stored in advance by mouse operation, moving a point on the graph of the incident X-ray distribution, increasing or decreasing the number of points on the graph, and the like. The incident X-ray distribution may be set in advance. The incident X-ray distribution may be automatically selected and acquired according to device information or the like.

The linear absorption coefficient model acquiring section 420 acquires a linear absorption coefficient model in which the energy dependency of the linear absorption coefficient is represented by a scale factor including a parameter. In an exemplary embodiment, the linear absorption coefficient model acquiring section 420 acquires a linear absorption coefficient model based on user designation. A functional form representing the energy dependency of the linear absorption coefficient is stored in a storage section of the correction apparatus 400 or the processing apparatus 300. For example, it is stored as a formula representing a model of the linear absorption coefficient $f(E_k)$ or a formula representing the reference energy $(E_0)$ and the scale factor $s(E_k)$. In addition, the element group that can be included in the sample and the parameter $\alpha$ of the linear absorption coefficient model are correlated and stored. When the linear absorption coefficient model is specified by the user, for example, one of functional forms representing a plurality of linear absorption coefficients stored in advance by a mouse operation is specified, and the parameter $\alpha$ is set by selecting an element group. In addition, the parameter $\alpha$ may be directly input by the user. As described above, in an exemplary embodiment, a UI function capable of setting a linear absorption coefficient model is used. The linear absorption coefficient model may be set in advance. Further, the linear absorption coefficient model may be automatically selected and acquired according to the sample information or the like.

The projection image acquiring section 430 acquires projection images from the CT device 200 or the processing apparatus 300. The correction section 440 corrects the projection image using the incident X-ray distribution and the linear absorption coefficient model. Thus, the CT images with reduced artifacts due to the beam hardening effect can be obtained.

[Measurement Method]

A sample is placed in the CT device 200, and moving the rotational axis and projecting the X-ray are repeated under a predetermined condition, thereby projection images are acquired while X-rays being irradiated to the sample. The CT device 200 transmits device information such as a scanning method and the acquired projection images as measured data to the processing apparatus 300 or the correction apparatus 400.

[Correction Method]

Figure 10:
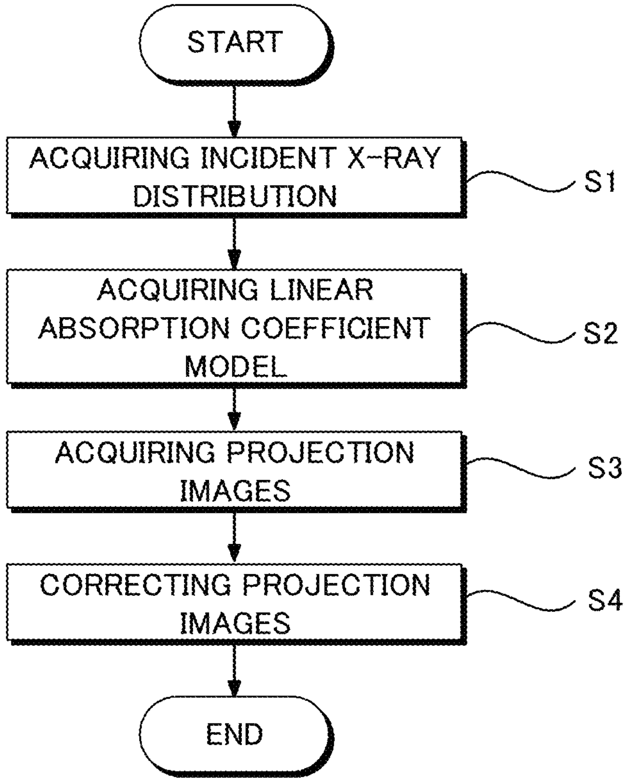
FIG. 10 is a flowchart showing an example of an operation of the correction apparatus.

FIG. 10 is a flowchart showing an example of an operation of the correction apparatus 400. First, the correction apparatus 400 acquires an incident X-ray distribution (step S1). Next, a linear absorption coefficient model is acquired (step S2). Next, projection images are acquired (step S3). Then, the projection images are corrected by using the acquired incident X-ray distribution and the acquired linear absorption coefficient model (step S4). In this way, the projection image can be corrected using the incident X-ray distribution and the linear absorption coefficient model in which the energy dependency of the linear absorption coefficient is represented by a scale factor including parameters. The acquisition of the incident X-ray distribution, the acquisition of the linear absorption coefficient model, and the acquisition of the projection image may be performed in any order.

[Correction and Reconfiguration Method]

The flowchart of FIG. 10 shows the operation of only the correction apparatus 400. Although this is sufficient for correction of the projection images, operations including measurement and reconstruction of the projection images are also described in order to clarify differences from the prior art.

Figure 11:
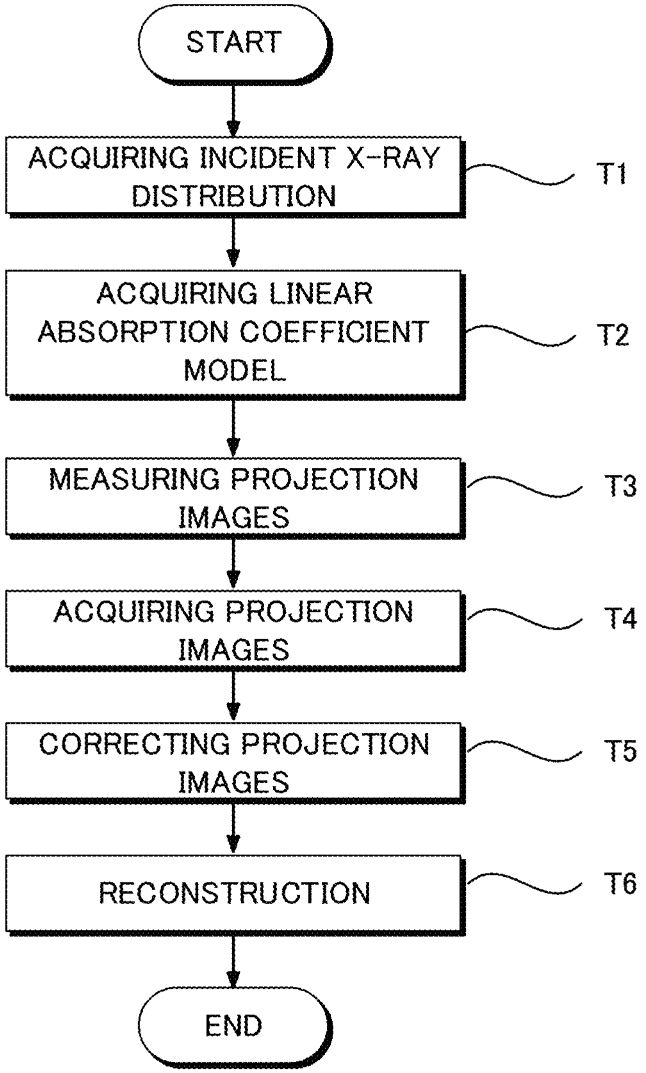
FIG. 11 is a flowchart showing an example of the operation of the system.

FIG. 11 is a flowchart illustrating an example of the operation of the system 100. First, the correction apparatus 400 acquires an incident X-ray distribution (step T1). Next, a linear absorption coefficient model is acquired (step T2). Next, CT device 200 measures the projection images (step T3). Measurement of the projection images includes repeating a movement of the rotational axis and a projection of the X-rays. Next, the correction apparatus 400 acquires projection images (step T4). Next, the projection images are corrected by using the acquired incident X-ray distribution and the acquired linear absorption coefficient model (step T5). Then, the processing apparatus 300 or the correction apparatus 400 reconstructs a CT image using the corrected projection images (step T6). In this way, reconstructed CT images can be obtained using the corrected projection images. In the same manner as described above, the acquisition of the incident X-ray distribution, the acquisition of the linear absorption coefficient model, and the acquisition of the projection image may be performed in any order.

In the prior art, after the reconstructed CT images are obtained, the image process for reducing artifacts is repeated. In contrast, according to the present disclosure, the correction for reducing artifacts is performed on the projection images before reconstruction. Thus, the calculation cost can be reduced.

Figure 12:
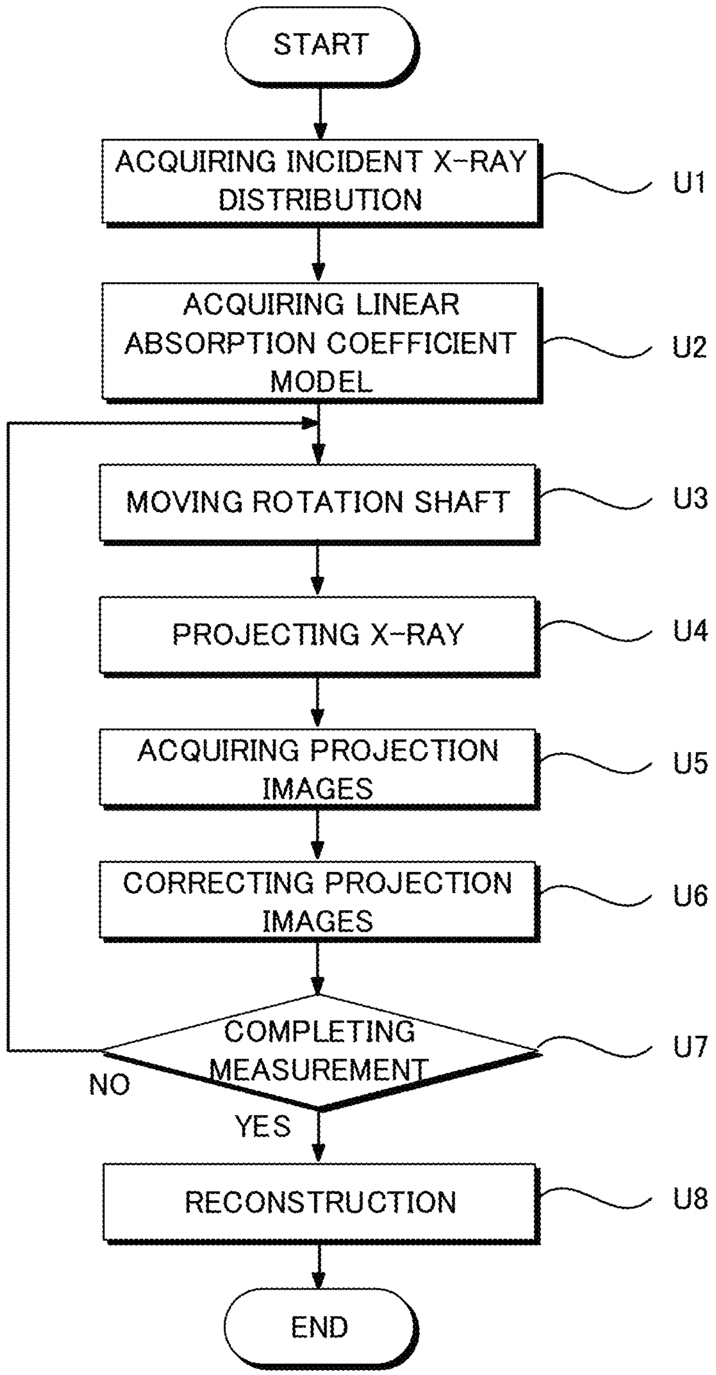
FIG. 12 is a flowchart showing a modified example of an operation of a system.

FIG. 12 is a flowchart showing a modified example of an operation of a system. First, the correction apparatus 400 acquires an incident X-ray distribution (step U1). Next, a linear absorption coefficient model is acquired (step U2). Next, the CT device 200 moves the rotating shaft (step U3).

Next, X-rays are projected (step U4). Next, the correction apparatus 400 acquires the projection images (step U5). Next, the projection images are corrected by using the acquired incident X-ray distribution and the acquired linear absorption coefficient model (step U6).

Next, the processing apparatus 300 or the correction apparatus 400 determines whether the measurement is completed (step U7). If it is determined in the step U7 that the measurement is not completed (step U7, NO), the process returns to the step U3. On the other hand, in step U7, when the processing apparatus 300 or the correction apparatus 400 determines that the measurement has been completed (step U7, YES), the CT image is reconstructed using the corrected projection images (step U8). In this way, the measurement of the projection images and the correction of the measured projection images can be processed in parallel, and the overall time can be shortened. The acquisition of the incident X-ray distribution and the acquisition of the linear absorption coefficient model may be performed in the reversed order.

Example 1

Figure 13A:
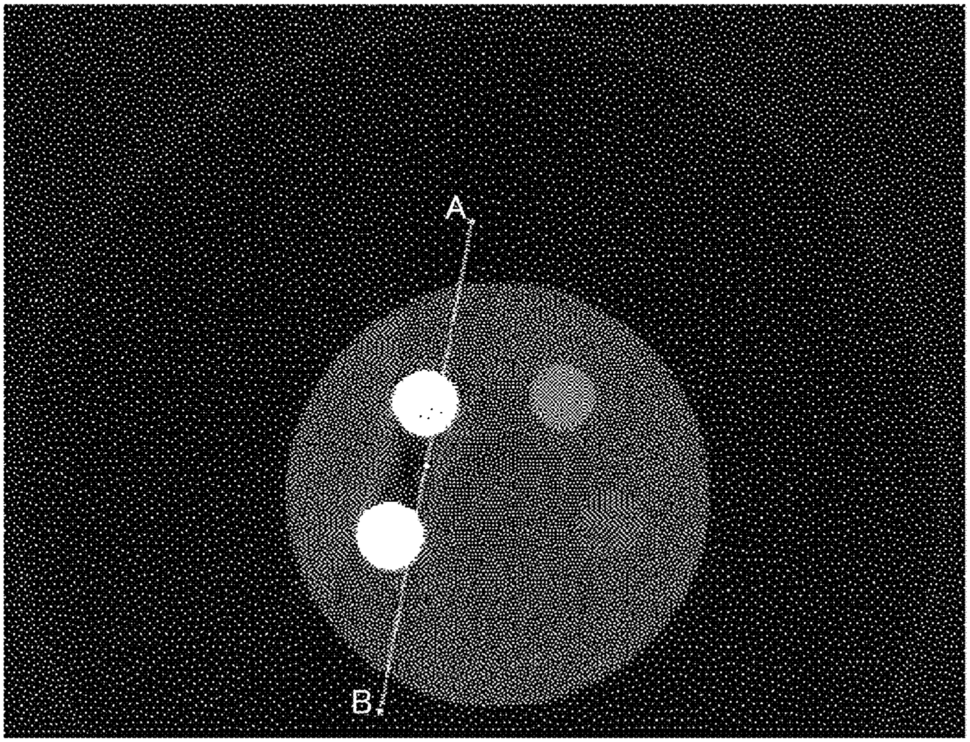
FIGS. 13A and 13B are a CT image of the sample 1 reconstructed using the uncorrected projection images and a CT image of the sample 1 reconstructed using the corrected projection images, respectively.
Figure 13B:
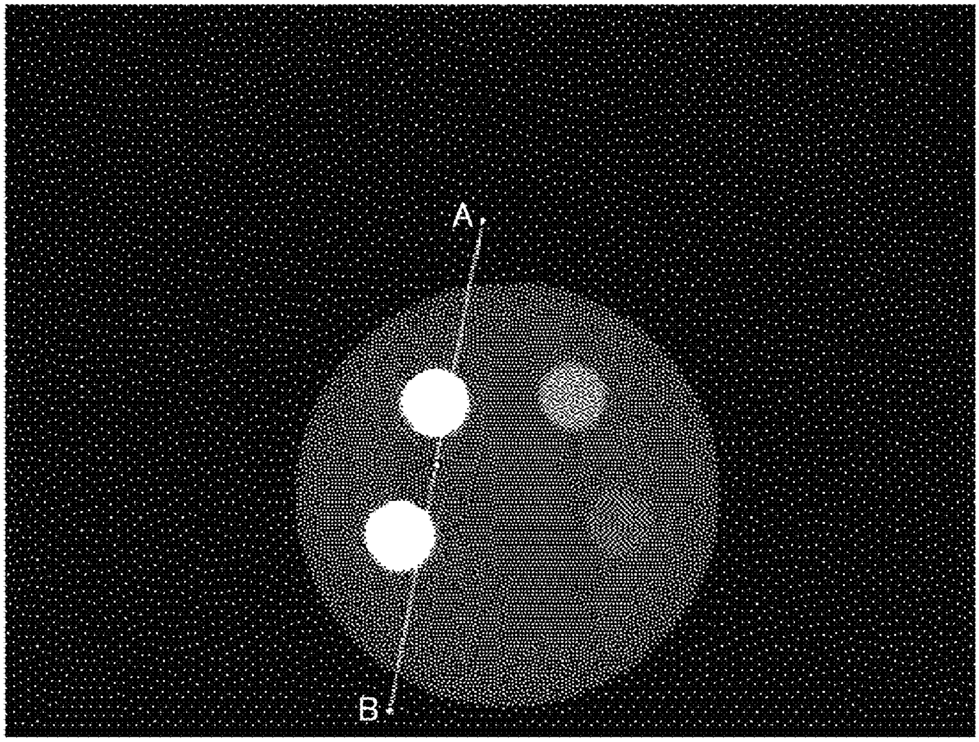
Figure 14A:
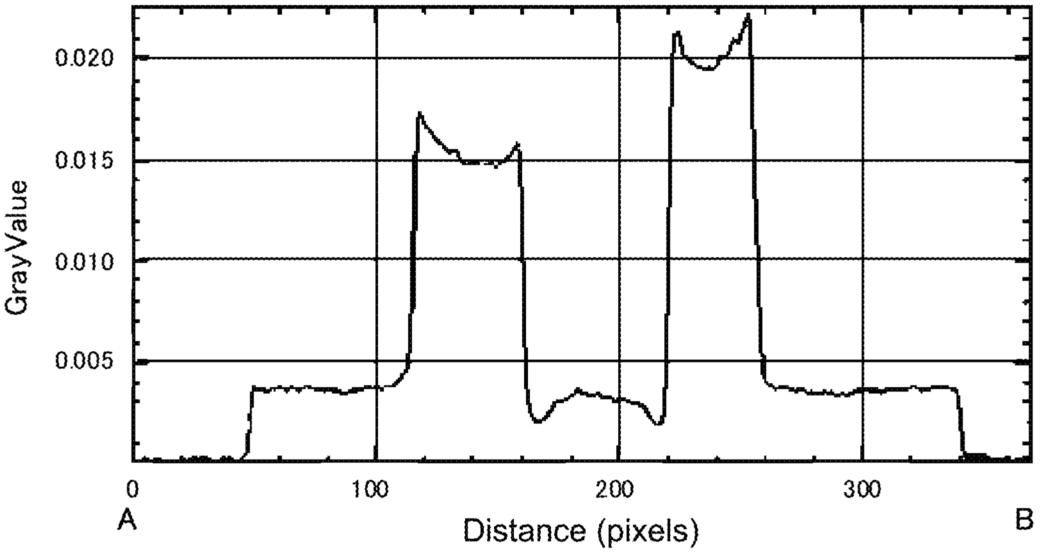
FIGS. 14A and 14B are graphs representing the line profiles on the straight lines AB of CT images of FIGS. 13A and 13B, respectively.
Figure 14B:
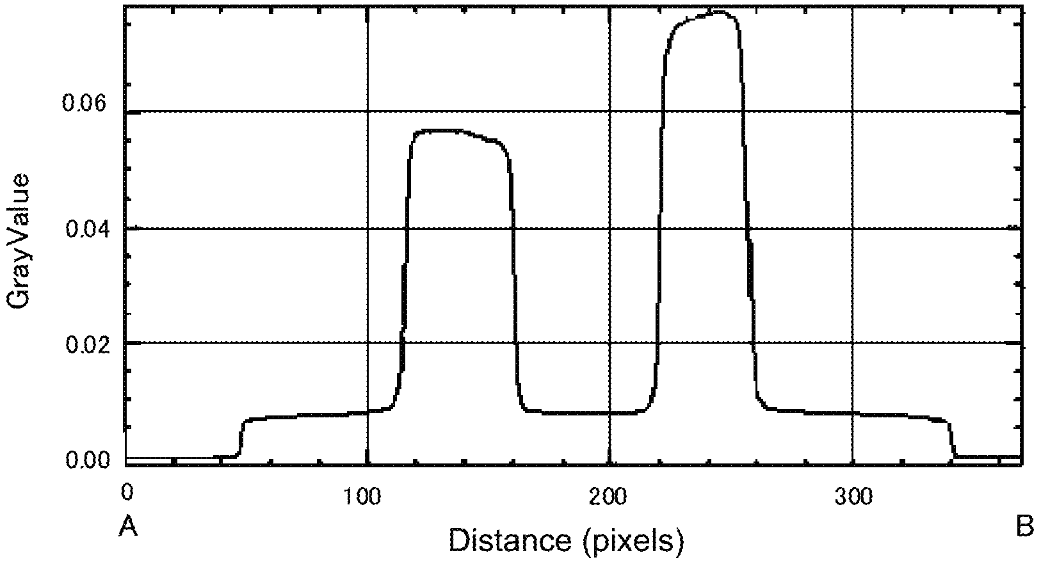

A cross-section of a hydroxyapatite phantom (Micro-CT HA Phantom, manufactured by QRM Corporation) (Sample 1) was observed using the above-configured system 100. CTLabHX manufactured by Rigaku was used as the CT device 200, and the measurement was performed at a 60 kV tube-voltage. FIGS. 13A and 13B are CT images of the sample 1 reconstructed using the uncorrected projection images and using the corrected projection images, respectively. Also, FIGS. 14A and 14B are graphs representing the line profiles on the line AB of CT images of FIGS. 13A and 13B, respectively. The reconstruction was performed using FDK method.

By comparing FIGS. 13A and 13B, it is recognized that the correction reduces streak artifacts between the two high absorbent bodies. Further, by comparing FIGS. 14A and 14B, it is confirmed that the cupping artifacts at the edge of the high absorbent body were reduced.

Example 2

Figure 15A:
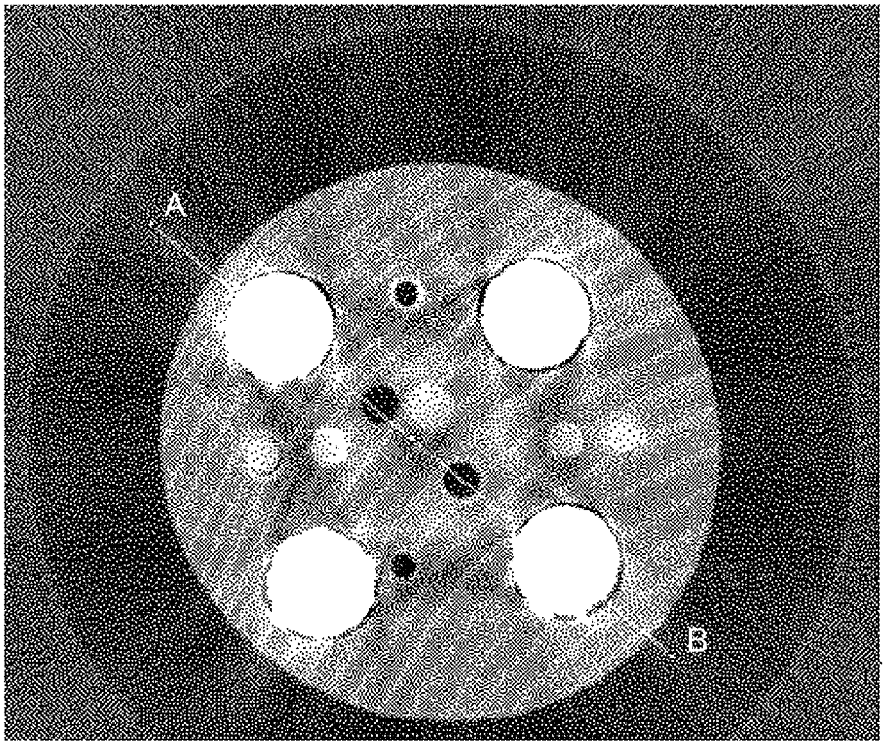
FIGS. 15A and 15B are a CT image of the sample 2 reconstructed using the uncorrected projection images and a CT image of the sample 2 reconstructed using the corrected projection images, respectively.
Figure 15B:
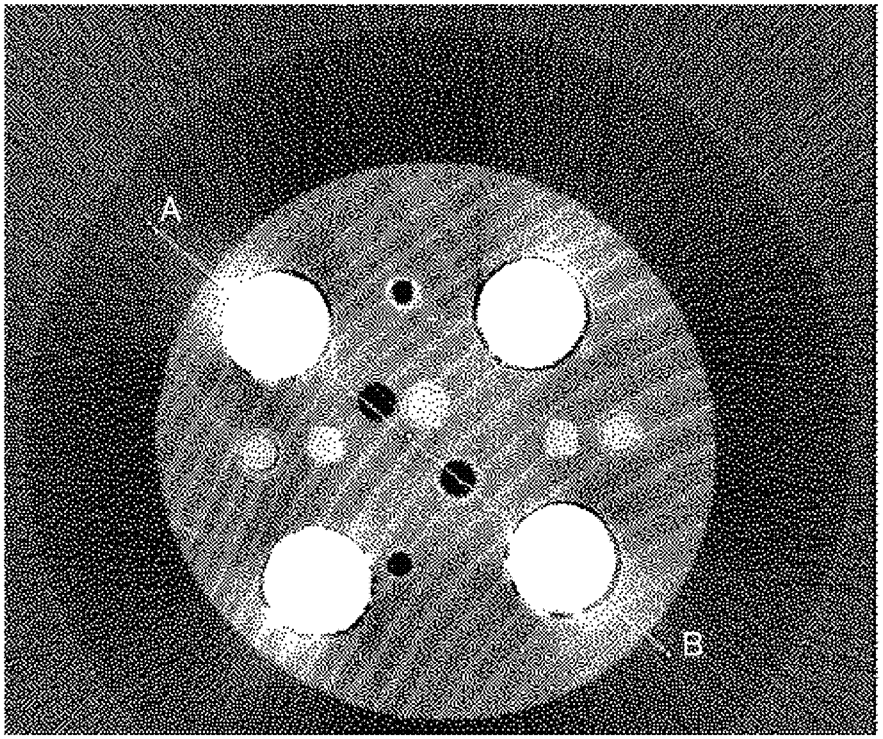
Figure 16A:
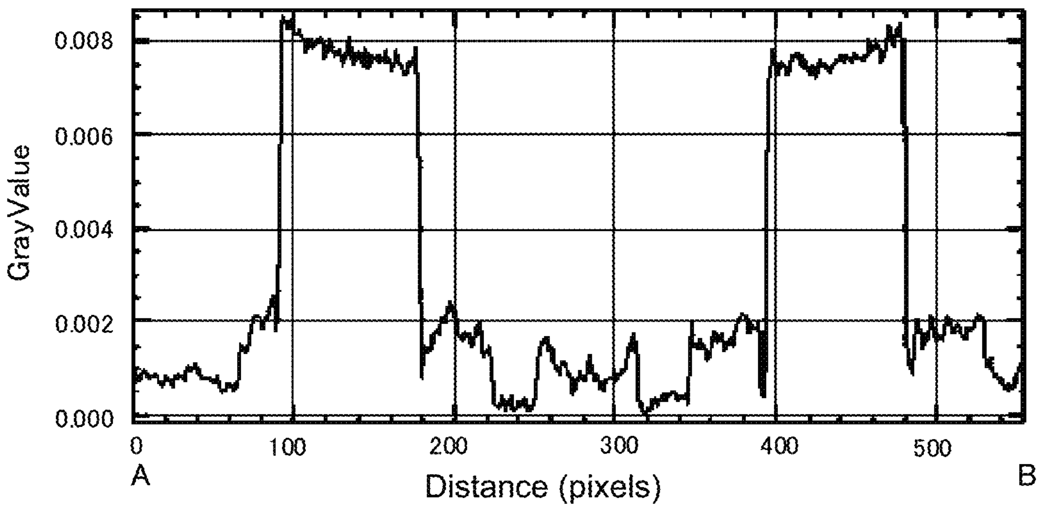
FIGS. 16A and 16B are graphs representing the line profiles on the straight lines AB of CT images of FIGS. 15A and 15B, respectively.
Figure 16B:
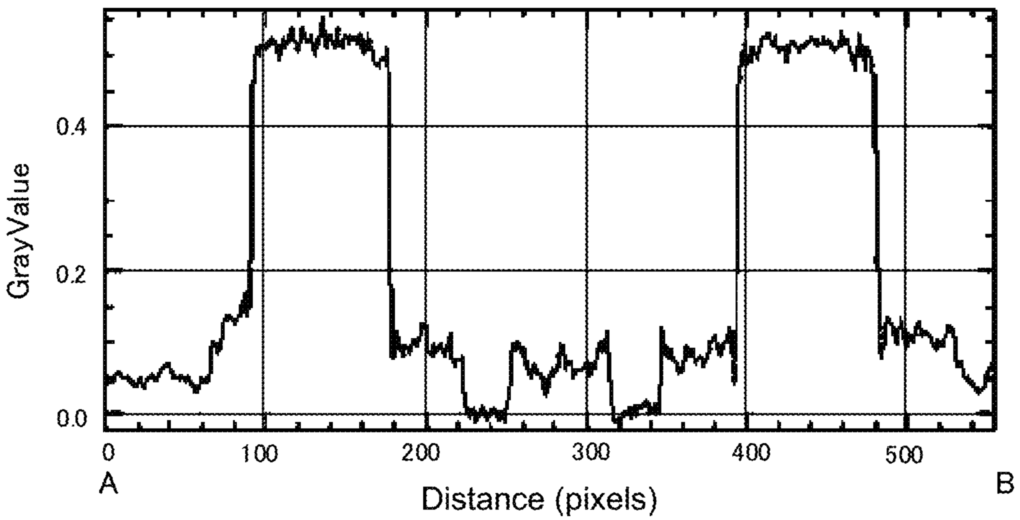

Next, five acrylic rods having a radial 3 mm and four aluminum rods having a radial 9 mm were inserted into the wood, two hollow holes having a radial 3 mm and two hollow holes having a radial 1.5 mm were formed, and Sample 2 was produced. Using the above system 100, the cross section of the Sample 2 was observed. The tube voltage was 100 kV. FIGS. 15A and 15B are CT images of the Sample 2 reconstructed using the uncorrected projection images and using the corrected projection images, respectively. Also, FIGS. 16A and 16B are graphs representing the line profiles on the line AB of CT images of FIGS. 15A and 15B, respectively.

By comparing FIGS. 15A and 15B, it is recognized that the correction reduces streak artifacts and dark bands. Further, by comparing FIGS. 16A and 16B, it is confirmed that the cupping artifacts at the end of the aluminum rod were reduced.

It has been confirmed that the correction apparatus, system, method and program of the present disclosure can effectively correct artifacts due to the beam hardening effect in the reconstruction of the CT image and reduce the calculation cost.

Incidentally, this application claims priority under Japanese Patent Application No. 2021-122585, filed on Jul. 27, 2021, the entire contents of Japanese Patent Application No. 2021-122585 are incorporated in this application by reference.

What is claimed is:

1. A correction apparatus for correcting an artifact due to a beam hardening effect caused in reconstructing a CT image, comprising:
processing circuitry configured to
acquire an incident X-ray distribution,
acquire a linear absorption coefficient model representing an energy dependency of a linear absorption coefficient by a scale factor including a parameter, wherein the scale factor is represented by a power function having a power exponent as the parameter,
acquire a projection image, and
correct the projection image using the incident X-ray distribution and the linear absorption coefficient model.

2. The correction apparatus according to claim 1,
wherein the linear absorption coefficient model is represented by a product of a linear absorption coefficient at a reference energy and the scale factor.

3. The correction apparatus according to claim 1,
wherein the parameter of the linear absorption coefficient model is one parameter.

4. The correction apparatus according to claim 1,
wherein the parameter of the linear absorption coefficient model is determined based on an energy range of the incident X-ray distribution.

5. The correction apparatus according to claim 1,
wherein the parameter of the linear absorption coefficient model is determined from a linear absorption coefficient of a representative group of elements.

6. The correction apparatus according to claim 1,
wherein the processing circuitry is further configured to acquire the incident X-ray distribution based on the number, the intensities and the energy values of monochromatic X-rays.

7. The correction apparatus according to claim 1,
wherein the processing circuitry is further configured to perform reconstruction based on the corrected projection images and generate a CT image, and
display the CT image.

8. A system comprising,
a CT device comprising an X-ray source for generating X-rays, a detector for detecting X-rays, and a rotation control unit for controlling the rotation of the X-ray source and the detector or a sample, and
the correction apparatus according to claim 1.

9. A method for correcting an artifact due to a beam hardening effect caused in reconstructing a CT image, comprising the steps of:
acquiring an incident X-ray distribution,
acquiring a linear absorption coefficient model representing an energy dependency of a linear absorption coefficient by a scale factor including a parameter, wherein the scale factor is represented by a power function having a power exponent as the parameter,
acquiring a projection image, and
correcting the projection image using the incident X-ray distribution and the linear absorption coefficient model.

10. A non-transitory computer readable recording medium having recorded thereon a program for correcting an artifact due to a beam hardening effect caused in reconstructing a CT image, causing a computer to execute the following process:
acquiring an incident X-ray distribution,
acquiring a linear absorption coefficient model representing an energy dependency of a linear absorption coefficient by a scale factor including a parameter, wherein the scale factor is represented by a power function having a power exponent as the parameter, acquiring a projection image, and correcting the projection image using the incident X-ray distribution and the linear absorption coefficient model.

* * * * *